(12) United States Patent
Pekarsky et al.

(10) Patent No.: US 8,813,485 B2
(45) Date of Patent: Aug. 26, 2014

(54) AUTOMATIC TRANSMISSION HYDRAULIC ACCUMULATOR

(75) Inventors: Lev Pekarsky, West Bloomfield, MI (US); Derek Kinch, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 735 days.

(21) Appl. No.: 13/165,008

(22) Filed: Jun. 21, 2011

(65) Prior Publication Data

US 2012/0324873 A1 Dec. 27, 2012

(51) Int. Cl.
 F16D 31/02 (2006.01)
 F16L 55/04 (2006.01)
 F16H 61/00 (2006.01)
 F15B 1/02 (2006.01)
 F15B 1/027 (2006.01)
 F15B 1/26 (2006.01)

(52) U.S. Cl.
 CPC .............. *F15B 1/02* (2013.01); *F16H 61/0021* (2013.01); *F15B 2201/21* (2013.01); *F15B 2201/31* (2013.01); *F15B 1/027* (2013.01); *F15B 1/26* (2013.01)
 USPC .................................. 60/413; 60/437; 138/31

(58) Field of Classification Search
 USPC ....................... 60/327, 413, 437, 438; 138/31; 180/165; 220/564
 See application file for complete search history.

(56) References Cited

U.S. PATENT DOCUMENTS

| | | | |
|---|---|---|---|
| 2,923,131 A | 2/1960 | Furman et al. | |
| RE25,700 E | 12/1964 | Furman et al. | |
| 3,201,939 A | 8/1965 | Gut | |
| 3,834,499 A | 9/1974 | Candellero et al. | |
| 3,985,063 A | 10/1976 | Lemon | |
| 4,077,502 A | 3/1978 | Nitsche et al. | |
| 4,215,545 A * | 8/1980 | Morello et al. | 60/413 |
| 4,382,484 A * | 5/1983 | Anderson et al. | 60/413 |
| 4,769,990 A * | 9/1988 | Bach et al. | 60/416 |
| 5,133,231 A | 7/1992 | Goto et al. | |
| 6,390,133 B1 * | 5/2002 | Patterson et al. | 138/31 |
| 6,494,545 B2 * | 12/2002 | Nakamura et al. | 60/413 |
| 6,848,548 B2 | 2/2005 | Alfredsson | |
| 6,973,781 B2 | 12/2005 | Brown et al. | |
| 2011/0219761 A1 * | 9/2011 | Johnson et al. | 60/414 |

* cited by examiner

*Primary Examiner* — Michael Leslie
(74) *Attorney, Agent, or Firm* — James Dottavio; MacMillan, Sobanski & Todd, LLC

(57) ABSTRACT

A hydraulic accumulator system for providing pressurized oil to a transmission in a vehicle. The system includes a transmission oil storage chamber to store oil at a predetermined level; and a hydraulic accumulator mounted in the oil storage chamber and including an accumulator piston mounted below the level of oil, separating an accumulator oil area from a remainder of the oil storage area and movable to increase and decrease the oil in the accumulator oil area, and a spring biasing the piston toward the accumulator oil area. The system also has a hydraulic assembly including a first oil passage for removing the oil from the remainder of the oil storage area, a second oil passage for directing oil into and out of the accumulator oil area below the predetermined oil level and a hydraulic circuit directing the oil from the first oil passage into the second oil passage.

9 Claims, 3 Drawing Sheets

AUTOMATIC TRANSMISSION HYDRAULIC ACCUMULATOR

BACKGROUND OF INVENTION

The present invention relates to a hydraulic system having a hydraulic accumulator for an automatic transmission and more particularly to a hydraulic accumulator that assists with maintaining a hydraulic pressure to allow for immediate engagement of the transmission upon startup for a vehicle that operates with an engine stop-start system.

In order to improve the fuel economy of vehicles that use an internal combustion engine for propulsion, some vehicles employ a stop-start strategy where, when the vehicle is stopped, for example, at a traffic light, the engine is automatically turned off. When the light turns green and the driver releases the brake to apply pressure to the accelerator pedal, the engine is automatically started to allow the vehicle to accelerate. For such vehicles that also have an automatic transmission, a need arises to somehow maintain the hydraulic pressure in the transmission so that the transmission can engage immediately after the engine is automatically restarted, which will allow the vehicle to accelerate without hesitation.

In order to overcome this concern, some employ an electric pump for pressurizing the hydraulic fluid rather than the conventional engine driven pump. While this allows for the maintenance of the hydraulic pressure while the engine is shut off at the stop light, this system may be more costly and require more packaging space than is desired. It also may require an additional battery to power the electric motor. This system may also require continuous operation even when a pressure charge is not required due to a delay between pump motor startup and hydraulic pump prime time.

Another attempt to overcome this concern uses an external gas accumulator to store extra hydraulic fluid outside of the transmission hydraulic circuit. This also has drawbacks in that it may cost more and take up more package space than is desired. In addition, an external gas accumulator may cause a fluid level change in the oil pan during period accumulation (lower fluid level) and discharge (higher fluid level) that create undesirable conditions, such as oil starvation or spin losses, during engagement of transmission clutches.

Another attempted solution is to use a spring-loaded piston accumulator with a mechanical latch. This approach calls for control system redesign to package it internally. It also presents the same issue as a gas accumulator by changing the fluid level in the oil pan during operation. Such a spring loaded accumulator may require one hundred percent capacity fluid charge in order to mechanically latch the accumulator's piston, which may present an issue when frequent stop-start events occur.

SUMMARY OF INVENTION

An embodiment contemplates a hydraulic accumulator system for providing pressurized oil to a transmission in a vehicle. The system may include a transmission oil storage chamber to store oil at a predetermined level; and a hydraulic accumulator mounted in the oil storage chamber and including an accumulator piston mounted below the predetermined level of oil, separating an accumulator oil area from a remainder of the oil storage area and movable to increase and decrease the amount of oil in the accumulator oil area, and a spring engaging the accumulator piston and biasing the piston toward the accumulator oil area. The system also may have a hydraulic assembly including a first oil passage for removing the oil from the remainder of the oil storage area, a second oil passage for directing oil into and out of the accumulator oil area below the predetermined oil level and a hydraulic circuit selectively directing the oil from the first oil passage into the second oil passage.

An embodiment contemplates a method of operating an automatic transmission for a vehicle comprising the steps of: driving a transmission oil pump with an internal combustion engine; while the engine is operating, pumping oil from an oil storage chamber, the oil storage chamber having an accumulator mounted therein and including a movable accumulator piston defining a top of an accumulator oil area, with the oil being drawn from a remainder of the oil storage chamber outside of the accumulator; selectively directing oil flow from the pump through a hydraulic assembly and to the accumulator oil area below the accumulator piston against a bias of a spring mounted in the oil storage chamber, the accumulator piston being located below a predetermine fluid level in the oil storage chamber; ceasing operation of the engine; and, while the engine has ceased operation, directing oil from the accumulator oil area into the transmission.

An advantage of an embodiment is that the hydraulic accumulator system maintains a minimum hydraulic charge pressure while the engine is off (under stop-start operating conditions), thus allowing the transmission to engage immediately when the engine is automatically restarted. The hydraulic accumulator can operate with a short stroke and a large surface area, thus allowing for easier integration with the transmission oil pan (or bottom of the transmission housing as the case may be). In addition, the fluid level in the transmission oil pan, while filling the accumulator, can remain relatively constant. These allow the accumulator to be relatively easily added to an existing transmission assembly, while also avoiding significant increases in packaging space taken up by the assembly. Another advantage is that the energy of the accumulator is stored in springs rather than containing a compressed fluid inside a pressurized housing, allowing for a lighter structure. An additional advantage is that a partially charged accumulator may still be used in brief stop-start situations, thus improving the functionality for a variety of operating conditions.

DETAILED DESCRIPTION

Figure 1:
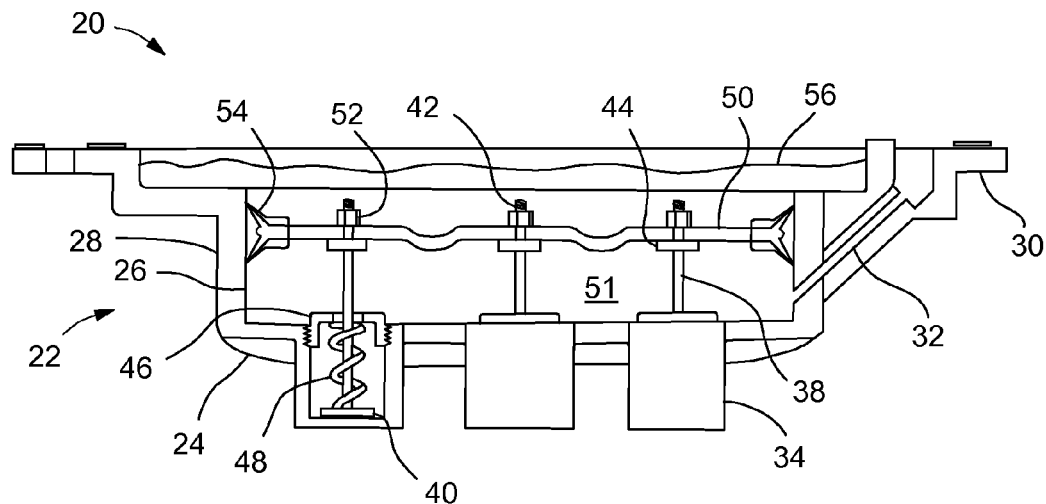
FIG. 1 is a schematic, side view of a hydraulic accumulator mounted in a transmission oil pan.
Figure 2:
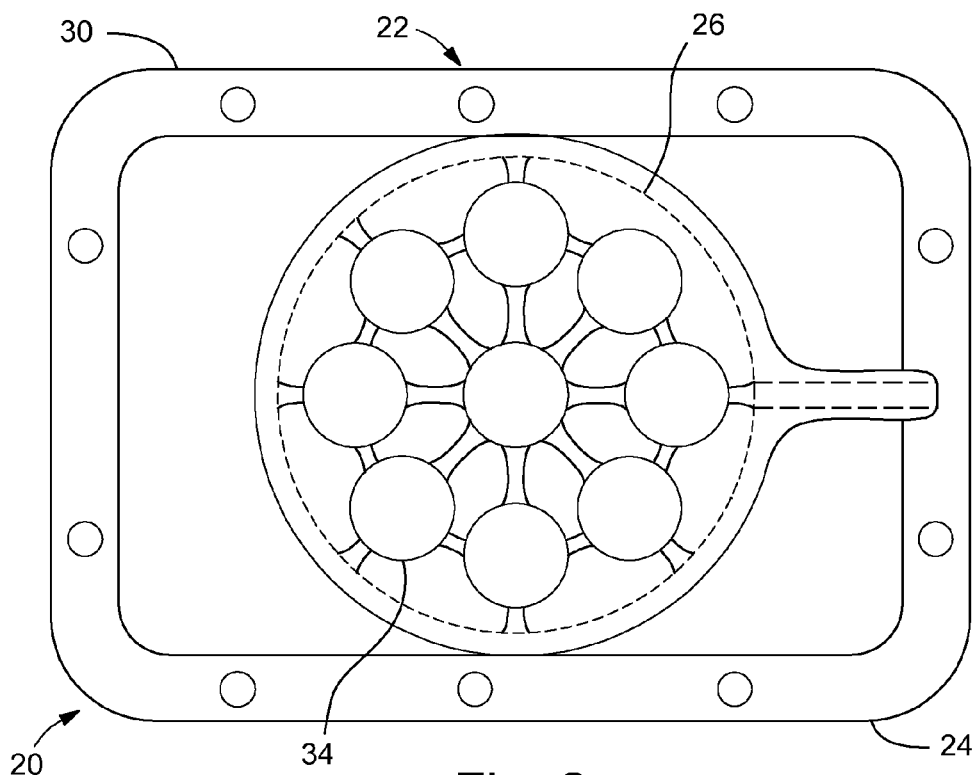
FIG. 2 is a schematic, bottom view of the hydraulic accumulator mounted in the transmission oil pan.

FIGS. 1 and 2 illustrate a hydraulic accumulator system 20 having a hydraulic accumulator 22 mounted in a transmission oil storage chamber 24. The oil storage chamber 24 is an oil pan or bottom of a transmission housing. The oil pan is typically used to store the transmission oil in vehicles with rear wheel drive transmissions while the bottom of the transmission housing is typically used to store the transmission oil in vehicles with front wheel drive transmissions. Thus, the overall result is the same—a transmission oil storage chamber. The hydraulic accumulator 22 is integral with this oil storage chamber 24. Thus, the oil storage chamber, as used herein, is not an inflatable or expandable hydraulic storage area (such as a bladder), and is not separate from the typical location where the transmission oil is stored.

The oil chamber 24 includes a cylindrical recessed portion 26 in which the hydraulic accumulator 22 is mounted. The side walls 28 of the oil chamber 24 extend above the level of the cylinder portion 26, with the oil chamber 24 also including a mounting flange 30 for mounting and sealing of the oil chamber 24. The oil chamber 24 includes a hydraulic passage 32 that connects the oil located in the accumulator 22 to other portions of a hydraulic circuit, discussed below. Cast or molded-in pockets 34 extend downward from the bottom wall 36 of the oil chamber 24.

The hydraulic accumulator 22 includes support rods 38, each having a support head 40 at one end mounted in a respective one of the pockets 34, threads 42 at the opposite end and a support flange 44 adjacent to the threads 42. The support rods 38 are retained in the pockets 34 by threaded inserts 46 that each thread into the top of a respective one of the pockets 34 and have a hole through which a respective rod 38 extends. A spring 48 is mounted between each support head 40 and corresponding threaded insert 46. The hydraulic accumulator also includes an accumulator piston 50 that is mounted onto the support rods 38 and secured against the support flanges by nuts 52 threaded onto the threads 42. Seals 54 are mounted around the perimeter of the accumulator piston 50 and seal the area in the cylindrical recessed portion 26 below the accumulator piston 50 (the accumulator oil area 51) from the remainder of the chamber above (and possibly also around) the accumulator piston 50. The fluid level 56 of transmission oil in the oil pan 24 is intentionally configured to be above the height of the accumulator piston 50. The opening of the hydraulic passage 32 into the recessed portion 26 is below the height of the accumulator piston 50, allowing the passage 32 to be used to direct oil into and out of the accumulator oil area 51.

While the springs 48 are configured to operate in compression to bias the accumulator piston 50 downward, an alternative configuration where the springs operate in tension to bias the accumulator piston 50 downward can also be employed. For example, the springs can be mounted between and secured at their ends to the threaded inserts 46 and the support flanges 44 (or bottom face of the piston 50), operating in tension to bias the accumulator piston 50 downward.

The hydraulic accumulator 22 works by pumping oil through the hydraulic passage 32 into the accumulator oil area 51 under the accumulator piston 50. As the oil is pumped into this accumulator 22, the accumulator piston 50 is pushed upward against the bias of the springs 48. The seals 54 keep the oil from escaping past the accumulator piston 50 to the upper portion of the oil pan 24. Even with the increase in oil in the accumulator 22, the fluid level 56 in the oil pan 24 can remain essentially constant—it is just a matter of how much oil is above and how much oil is below the accumulator piston 50. The oil is essentially pumped from above the accumulator piston 50 to below it. The oil chamber 24 does not expand or contract during this operation—the movement of the accumulator piston 50 against the bias of the springs 48 creates the usable hydraulic pressure. The oil storage chamber 24 itself forms part of the hydraulic accumulator 22, thus the hydraulic accumulator 50 is integral with this oil storage chamber 24.

Figure 3:
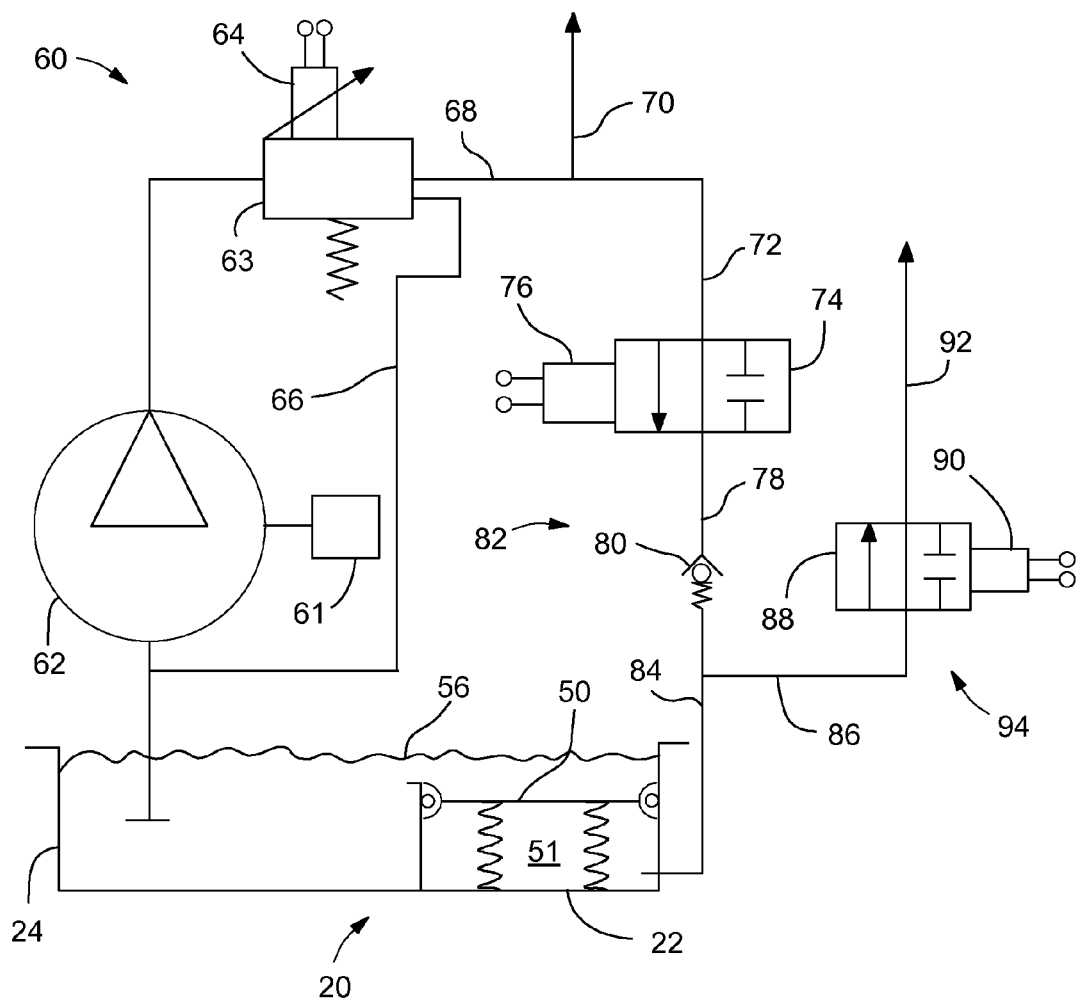
FIG. 3 is a schematic diagram of a portion of a transmission hydraulic circuit that employs a hydraulic accumulator in the oil pan.

FIG. 3 schematically illustrates a hydraulic system 60 that may be employed with the hydraulic accumulator system 20 illustrated in FIGS. 1 and 2 to provide hydraulic pressure during stop-start vehicle events. The hydraulic accumulator 22 is schematically illustrated in FIG. 3 mounted in the oil storage chamber 24, with the accumulator piston 50 below the fluid level 56. A pump 62, which is driven by the vehicle's internal combustion engine 61, draws transmission oil from the oil storage chamber 24, from outside of the accumulator oil area 51.

The output of the pump 62 directs the oil into a main regulating valve 63 that includes a variable solenoid 64, which controls through which output of the main valve 63 the oil flows. That is, the oil may be partially or totally directed into a return line 66 that directs oil back to the pump inlet, or the oil may be partially or totally directed into an oil line 68 that leads to a line 70 directing oil to the automatic transmission control system or to a line 72 that directs the oil to a check shuttle valve 74. The check shuttle valve 74 includes an on/off solenoid 76 that can actuate the valve 74 to selectively allow or block the flow of oil therethrough. The output of the valve 74 directs oil into a line 78 leading to a one-way ball valve 80. The ball valve 80 is configured to allow flow when the pressure is above a predetermined threshold, and block the flow of oil below this threshold. The ball valve 80 also always blocks flow in the opposite direction. The ball valve 80 and check shuttle valve 74 are part of a hydraulic charge circuit 82 for the hydraulic accumulator 22.

The output of the ball valve 80 directs the oil into an oil charge line 84 that directs the oil into the hydraulic passage (shown in FIG. 1) for charging and discharging the accumulator 22. The output of the ball valve 80 also directs oil into a line 86 that connects to an input of another shuttle valve 88, which is controlled by an on-off solenoid 90 that can selectively allow or block the flow of oil therethrough. An oil line 92 leading from the output of the valve 88 directs the oil to areas of the transmission that control one or more clutches in the automatic transmission. This shuttle valve 88 and oil line 92 are part of a discharge circuit 94 for the hydraulic accumulator 22.

The operation of the hydraulic system 60 and hydraulic accumulator system 20 shown in FIGS. 1-3 will now be discussed. When the vehicle engine is started, the engine driven pump 62 pumps transmission oil from the transmission oil storage chamber 24 to the main regulating valve 63. The variable solenoid 64 is controlled to regulate the transmission hydraulic pressure by controlling how much oil is directed toward the transmission control system and how much oil is directed through the return line 66. The hydraulic pressure is employed to operate the automatic transmission.

When it is desirable to pressurize the hydraulic accumulator 22, the on/of solenoid 76 actuates the check shuttle valve 74 to allow flow through it. As the oil pressure differential acting on the ball valve 80 reaches the predetermined threshold (cracking pressure), the ball valve 80 opens, allowing oil flow through the charge line 84 and hydraulic passage 32 into the cylindrical recessed portion 26. Thus, the hydraulic charge circuit 82 is opened for charging the hydraulic accumulator 22. The shuttle valve 88 in the hydraulic discharge circuit 94 is of course closed during this time. This shuttle valve 88 may be designed with small clearances to minimize fluid leakage during periods when flow through it is not desired, i.e., when the accumulator is charged and no discharge oil flow is desired.

As the oil is pumped into the accumulator 22, the accumulator piston 50 is lifted upward against the bias of the springs 48, thus storing oil under pressure within the accumulator oil area 51. This is accomplished without affecting the fluid level 56 in the oil storage chamber 24 as the oil is, in effect, pumped from above the accumulator piston 50 to below the accumulator piston 50. The ball valve 80 prevents back flow through the charge circuit 82. When the accumulator 22 approaches the maximum desired capacity, the solenoid 76 may be actuated to close the shuttle valve 74.

When the vehicle comes to a stop, for example at a traffic light, the engine may be automatically shut off (stop-start operation) in order to save fuel. The accumulator 22 remains filled with the oil under pressure. When the light turns green and the operator lets up on the brake, the engine is automatically restarted. At this time, the solenoid 90 opens the shuttle valve 88. The oil under pressure in the accumulator 22 will flow out through the discharge circuit 94 to control clutches (not shown) where hydraulic pressure is needed in the transmission in order to immediately set the vehicle in motion when the engine is restarted. Of course, as the engine is started, the pump 62 again begins to pump oil through the hydraulic system 60. Even with oil flowing out of the accumulator 22, the fluid level 56 in the oil storage chamber 24 can be maintained with return oil.

Figure 4:
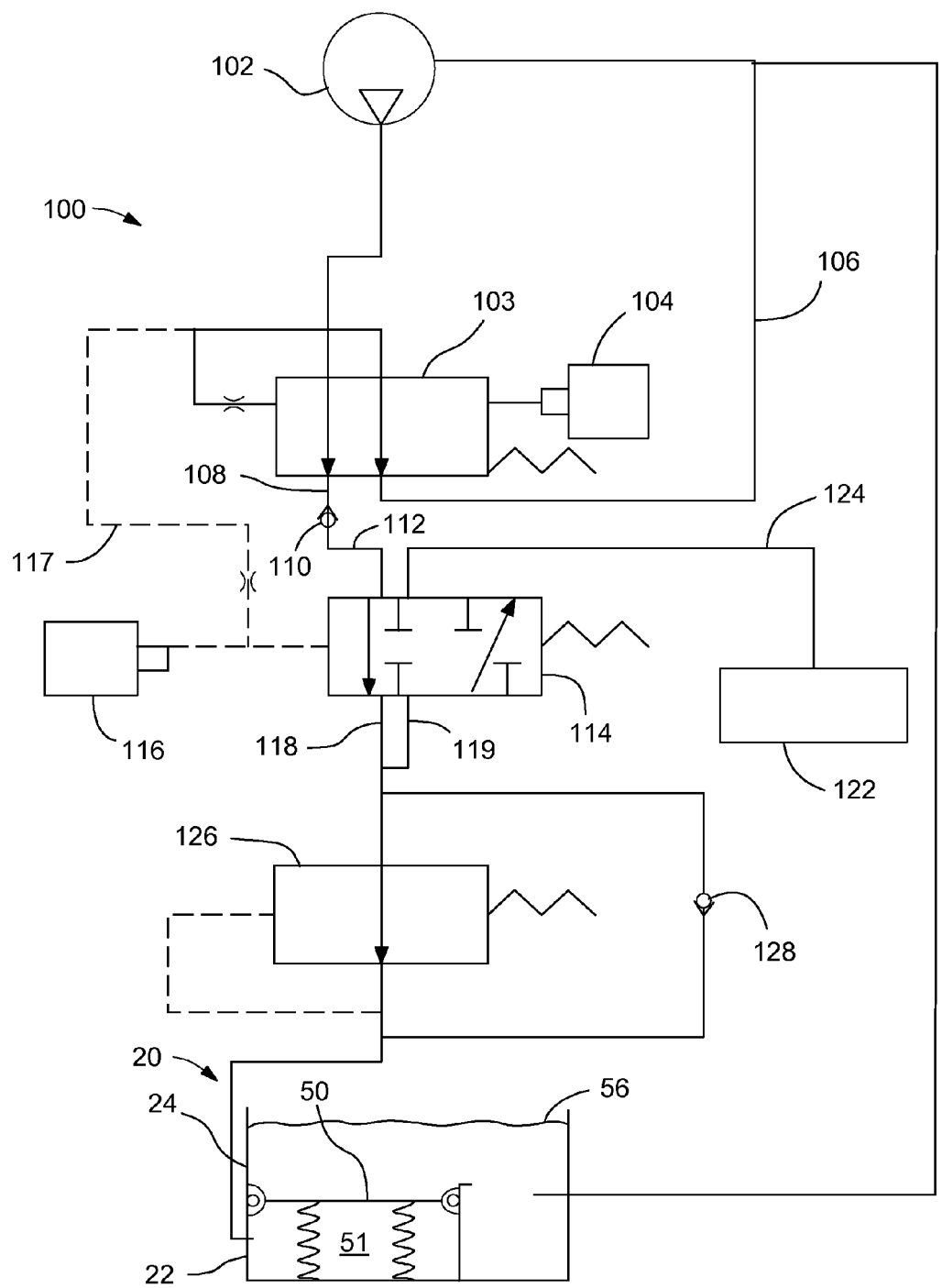
FIG. 4 is a schematic diagram of an alternate embodiment of a portion of the transmission hydraulic circuit that employs the hydraulic accumulator in the oil pan.

FIG. 4 schematically illustrates another hydraulic system 100 that may be employed with the hydraulic accumulator system illustrated in FIGS. 1 and 2 to provide hydraulic pressure during stop-start vehicle events. The hydraulic accumulator 22 is schematically illustrated in FIG. 4 mounted in the oil storage chamber 24, with the accumulator piston 50 below the fluid level 56. A pump 102, which is driven by the vehicle's internal combustion engine, draws transmission oil from the oil storage chamber 24 from outside of the hydraulic accumulator 22.

The output of the pump 102 directs the oil into a main regulating valve 103 that includes a solenoid 104 that controls through which output of the main valve 103 the oil flows. That is, the oil may be partially or totally directed into a return line 106 that directs oil back to the pump inlet or partially or totally directed into an oil line 108 that leads to a ball check valve 110. The ball check valve 110 allows for flow from the main regulating valve 103 when the pressure difference is above a predetermined threshold but blocks flow in the other direction.

A line 112 directs the oil from the check valve 110 to an accumulator feed valve 114. The accumulator feed valve 114 may be actuated by a solenoid 116 or alternatively through regulating the hydraulic flow 117 (both options shown in FIG. 4). The accumulator feed valve 114 has two sets of flow paths for the oil. A first set allows flow from line 112 to another oil line 118 that eventually leads to the accumulator and blocks flow from an oil line 119 that extends from oil line 118 and eventually leads to forward and low reverse clutches 122 in the automatic transmission. A second set allows for oil flow from the accumulator through the valve 114 and through a line 124 that directs the oil to the forward and low reverse clutches 122.

A feed limiting valve 126 is located between the accumulator feed valve 114 and the accumulator 22. In addition, a ball check valve 128 allows for flow in one direction around the feed limiting valve 126 when the pressure differential at the check valve 128 exceeds a predetermined value. The feed limiting valve 126 is configured to block the flow at a predetermined pressure.

The operation of the hydraulic system 100 and hydraulic accumulator system 20 shown in FIGS. 1 and 4 will now be discussed. When the vehicle engine is started, the engine driven pump 102 pumps transmission oil from the transmission oil storage chamber 24 to the main regulating valve 103. The solenoid 104 is controlled to regulate the hydraulic pressure of the transmission by controlling how much oil is directed toward the transmission control system and how much oil is directed through the return line 106. The hydraulic pressure is employed to operate the automatic transmission.

When it is desirable to pressurize the hydraulic accumulator 22, the solenoid 116 actuates the actuator feed valve 114 to allow flow through it into oil line 118. This allows oil flow through the oil line 118, the feed limiting valve 126 and hydraulic passage 32 into the cylindrical recessed portion 26. Thus, the hydraulic charge circuit is opened for charging the hydraulic accumulator 22. The feed limiting valve 126 may be set to modulate pressure at a predetermined pressure threshold. That is, for example, the feed limiting valve 126 may be set to allow oil flow up to sixty pounds per square inch of pressure in the hydraulic accumulator 22 and then block flow above that pressure.

As the oil is pumped into the accumulator 22, the accumulator piston 50 is lifted upward against the bias of the springs 48, thus storing oil under pressure within the accumulator oil area 51. This is accomplished without affecting the fluid level 56 in the oil storage area 24 as the oil is, in effect, pumped from above the accumulator piston 50 to below the accumulator piston 50.

When the vehicle comes to a stop, for example at a traffic light, the engine may be automatically shut off (stop-start operation) in order to save fuel. The accumulator 22 remains filled with the oil under pressure. When the light turns green and the operator lets up on the brake, the engine is automatically restarted. At this time, the solenoid 116 moves the accumulator feed valve 114 to the position that directs oil flowing from oil line 118 into oil line 124 to the forward and low reverse clutches 122. The oil under pressure in the accumulator 22 will push open the check valve 128, causing oil to flow from the accumulator 22 to the clutches 122, where hydraulic pressure is needed in the transmission in order to immediately set the vehicle in motion when the vehicle is restarted.

Of course, as the engine is started, the pump 102 again pumps oil through the hydraulic system 100. Even with oil flowing out of the accumulator 22, the fluid level 56 in the oil storage chamber 24 can be maintained with return oil.

While certain embodiments of the present invention have been described in detail, those familiar with the art to which this invention relates will recognize various alternative designs and embodiments for practicing the invention as defined by the following claims.

What is claimed is:

1. A hydraulic accumulator system for providing pressurized oil to a transmission in a vehicle comprising:
   a transmission oil storage chamber configured to store oil at a predetermined level;
   a hydraulic accumulator mounted in the oil storage chamber and including an accumulator piston, the accumulator piston mounted below the predetermined level of oil, separating an accumulator oil area from a remainder of the oil storage area and movable to increase and decrease the amount of oil in the accumulator oil area, and a spring configured to engage the accumulator piston and bias the piston toward the accumulator oil area; and
   a hydraulic assembly including a first oil passage for removing the oil from the remainder of the oil storage area, a second oil passage for directing oil into and out of the accumulator oil area below the predetermined oil level and a hydraulic circuit configured to selectively direct the oil from the first oil passage into the second oil passage.

2. The system of claim 1 wherein the hydraulic accumulator includes at least one pocket extending downward from a bottom surface of the oil storage chamber, a rod engageable with a bottom of the pocket at a first end and secured to the accumulator piston at an opposed second end, and the spring mounted in the pocket and configured to engage the rod to bias the rod toward the bottom of the pocket.

3. The system of claim 2 wherein the hydraulic accumulator further includes a threaded insert mounted at an upper opening of the pocket, the threaded insert securing the spring in the pocket, and wherein the rod includes a support head at the first end that is engageable with and compresses the spring when the accumulator piston moves upward.

4. The system of claim 1 wherein the hydraulic accumulator is defined by a recessed cylinder portion of the oil storage chamber extending downward in the oil storage chamber, and the accumulator piston extends across an upper portion of the recessed cylinder portion to divide the oil storage chamber into the accumulator oil area below the accumulator piston and the remainder of the oil storage area above the accumulator piston.

5. The system of claim 1 wherein the hydraulic assembly includes a pump configured to be driven by an internal combustion engine and configured to pump oil from the remainder of the oil storage area through the first oil passage.

6. The system of claim 5 wherein the hydraulic assembly includes:
   a main regulating valve configured to selectively redirect oil flowing from the pump either back to an inlet to the pump or to a charge circuit portion of the hydraulic assembly; and
   an open/close valve configured to receive flowing oil from the main regulating valve and selectively allow or prevent flow through the open/close valve, wherein the open/close valve is opened when charging of the hydraulic accumulator is desired.

7. The system of claim 6 wherein the hydraulic assembly includes a one-way check valve configured to receive oil flow from the open/close valve and allow flow of oil through the one-way check valve into the second oil passage when an oil pressure differential acting on the one-way check valve exceeds a predetermined threshold.

8. The system of claim 6 wherein the hydraulic assembly includes an open/close discharge valve configured to receive oil from the hydraulic accumulator and selectively allow oil to flow from the accumulator to the transmission.

9. A method of operating an automatic transmission for a vehicle comprising the steps of:
   (a) driving a transmission oil pump with an internal combustion engine;
   (b) while the engine is operating, pumping oil from an oil storage chamber, the oil storage chamber having an accumulator mounted therein and including a movable accumulator piston defining a top of an accumulator oil area, with the oil being drawn from a remainder of the oil storage chamber outside of the accumulator;
   (c) selectively directing oil flow from the pump through a hydraulic assembly and to the accumulator oil area below the accumulator piston against a bias of a spring mounted in the oil storage chamber, the accumulator piston being located below a predetermine fluid level in the oil storage chamber;
   (d) automatically ceasing operation of the engine in a stop-start mode; and
   (e) automatically starting the engine to end the stop-start mode, and substantially simultaneously directing oil from the accumulator oil area into the transmission.

\* \* \* \* \*